(12) United States Patent
Nanda et al.

(10) Patent No.: US 8,078,880 B2
(45) Date of Patent: Dec. 13, 2011

(54) PORTABLE PERSONAL IDENTITY INFORMATION

(75) Inventors: Arun K. Nanda, Redmond, WA (US);
Ruchita Bhargava, Redmond, WA (US);
Lucas R. Melton, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 922 days.

(21) Appl. No.: 11/495,826

(22) Filed: Jul. 28, 2006

(65) Prior Publication Data

US 2008/0028215 A1    Jan. 31, 2008

(51) Int. Cl.
*G06F 21/00*     (2006.01)

(52) U.S. Cl. ......... 713/182; 713/168; 713/175; 709/203

(58) Field of Classification Search .................. 713/168, 713/182–186, 175; 726/4–21; 709/203
See application file for complete search history.

(56) References Cited

U.S. PATENT DOCUMENTS

| | | | |
|---|---|---|---|
| 5,442,704 A | 8/1995 | Holtey | |
| 5,657,388 A | 8/1997 | Weiss | |
| 5,659,616 A * | 8/1997 | Sudia | 705/76 |
| 5,678,015 A | 10/1997 | Goh | |
| 5,887,131 A | 3/1999 | Angelo | |
| 5,907,838 A | 5/1999 | Miyasaka et al. | |
| 5,995,625 A * | 11/1999 | Sudia et al. | 705/51 |
| 6,005,939 A | 12/1999 | Fortenberry | |
| 6,016,476 A | 1/2000 | Maes et al. | |
| 6,161,125 A | 12/2000 | Traversat | |
| 6,442,532 B1 | 8/2002 | Kawan | |
| 6,526,434 B1 * | 2/2003 | Carlson et al. | 709/203 |
| 6,553,494 B1 | 4/2003 | Glass | |
| 6,754,829 B1 | 6/2004 | Butt et al. | |
| 6,785,810 B1 | 8/2004 | Lirov | |
| 6,791,583 B2 | 9/2004 | Tang et al. | |
| 6,802,002 B1 * | 10/2004 | Corella | 713/175 |
| 6,810,480 B1 | 10/2004 | Parker | |
| 6,817,521 B1 | 11/2004 | Matada | |
| 6,836,765 B1 | 12/2004 | Sussman | |
| 6,839,690 B1 | 1/2005 | Foth | |
| 6,856,963 B1 | 2/2005 | Hurwitz | |
| 6,879,769 B1 | 4/2005 | Kawai | |

(Continued)

FOREIGN PATENT DOCUMENTS

| | | |
|---|---|---|
| CN | 1456983 A | 11/2003 |
| WO | WO 2008/088944 A1 | 7/2008 |
| WO | WO 2008/088945 A1 | 7/2008 |
| WO | WO 2008/144204 A1 | 11/2008 |

(Continued)

OTHER PUBLICATIONS

Written Opinion of the International Searching Authority and International Search Report in PCT Application No. PCT/US2007/013310, mailed Dec. 4, 2007.

(Continued)

*Primary Examiner* — Thanhnga B Truong
(74) *Attorney, Agent, or Firm* — Merchant & Gould, P.C.

(57) ABSTRACT

A user interacts with a client containing personal identity information operable to identify the user to a relying party when the relying party is presented with claims comprising a portion of the personal identity information. The personal identity information includes one or more claims, metadata associated with the one or more claims, and backing data associated with the one or more claims. The user may initiate use of another client and seek to be identified by the relying party while interacting with the other client by first porting the personal identity information to the other client. Porting the personal identity information includes binding the personal identity information and sending the bound personal identity information to a receiving client.

17 Claims, 5 Drawing Sheets

U.S. PATENT DOCUMENTS

| | | |
|---|---|---|
| 6,934,841 B2 | 8/2005 | Boyles |
| 6,934,913 B2 | 8/2005 | Le |
| 6,955,295 B2 | 10/2005 | Hosogoe |
| 6,957,338 B1 | 10/2005 | Sumino |
| 6,981,043 B2 | 12/2005 | Botz et al. |
| 6,993,659 B2 | 1/2006 | Milgramm |
| 7,000,108 B1 * | 2/2006 | Yarsa et al. ............... 713/167 |
| 7,003,495 B1 | 2/2006 | Burger et al. |
| 7,007,298 B1 | 2/2006 | Shinzaki |
| 7,020,474 B2 | 3/2006 | Scott |
| 7,020,778 B1 | 3/2006 | Miettinen |
| 7,047,418 B1 | 5/2006 | Ferren |
| 7,069,447 B1 | 6/2006 | Corder |
| 7,083,095 B2 | 8/2006 | Hendrick |
| 7,103,773 B2 | 9/2006 | Erickson |
| 7,131,583 B2 | 11/2006 | Jaros et al. |
| 7,146,159 B1 | 12/2006 | Zhu |
| 7,162,475 B2 | 1/2007 | Ackerman |
| 7,162,581 B2 | 1/2007 | Newman et al. |
| 7,206,432 B2 * | 4/2007 | Iwamura ................ 382/100 |
| 7,231,371 B1 * | 6/2007 | Cantini et al. ............ 705/65 |
| 7,266,705 B2 * | 9/2007 | Peck et al. ............. 713/193 |
| 7,356,837 B2 | 4/2008 | Asghari-Kamrani et al. |
| 7,409,543 B1 | 8/2008 | Bjorn |
| 7,424,457 B2 | 9/2008 | Khaishgi |
| 7,451,921 B2 | 11/2008 | Dowling et al. |
| 7,475,429 B2 * | 1/2009 | Carro ................ 726/30 |
| 7,680,819 B1 | 3/2010 | Mellmer |
| 7,788,499 B2 | 8/2010 | Cameron et al. |
| 2001/0034746 A1 | 10/2001 | Tsakiris |
| 2001/0054148 A1 | 12/2001 | Hoornaert |
| 2002/0010862 A1 | 1/2002 | Ebara |
| 2002/0026397 A1 | 2/2002 | Ieta et al. |
| 2002/0046041 A1 | 4/2002 | Lang |
| 2002/0103801 A1 | 8/2002 | Lyons |
| 2002/0124115 A1 | 9/2002 | McLean |
| 2002/0133535 A1 | 9/2002 | Lucovsky |
| 2002/0175916 A1 | 11/2002 | Nichols |
| 2002/0184508 A1 * | 12/2002 | Bialick et al. ............ 713/182 |
| 2002/0194139 A1 | 12/2002 | Kianian |
| 2003/0005305 A1 * | 1/2003 | Brickell ................ 713/177 |
| 2003/0018585 A1 | 1/2003 | Butler et al. |
| 2003/0046575 A1 | 3/2003 | Bhogal |
| 2003/0046591 A1 | 3/2003 | Ashghari-Kamrani |
| 2003/0048904 A1 | 3/2003 | Wang et al. |
| 2003/0074660 A1 | 4/2003 | McCormack |
| 2003/0135500 A1 | 7/2003 | Chevrel et al. |
| 2003/0149781 A1 | 8/2003 | Yared |
| 2003/0172090 A1 | 9/2003 | Asunmaa |
| 2003/0177356 A1 | 9/2003 | Abela |
| 2003/0182421 A1 | 9/2003 | Faybishenko |
| 2003/0188019 A1 | 10/2003 | Wesley |
| 2003/0200175 A1 | 10/2003 | Wang |
| 2003/0200217 A1 | 10/2003 | Ackerman |
| 2003/0216136 A1 | 11/2003 | McBrearty et al. |
| 2003/0229783 A1 | 12/2003 | Hardt |
| 2003/0233580 A1 | 12/2003 | Keeler et al. |
| 2004/0010720 A1 | 1/2004 | Singh |
| 2004/0054913 A1 | 3/2004 | West |
| 2004/0064708 A1 | 4/2004 | Angelo et al. |
| 2004/0103040 A1 | 5/2004 | Ronaghi |
| 2004/0103324 A1 | 5/2004 | Band |
| 2004/0111520 A1 | 6/2004 | Krantz |
| 2004/0114571 A1 | 6/2004 | Timmins |
| 2004/0122926 A1 | 6/2004 | Moore et al. |
| 2004/0162786 A1 | 8/2004 | Cross |
| 2004/0205243 A1 | 10/2004 | Hurvig et al. |
| 2004/0230831 A1 | 11/2004 | Spelman |
| 2004/0250084 A1 | 12/2004 | Hamid |
| 2005/0044423 A1 | 2/2005 | Mellmer |
| 2005/0050363 A1 | 3/2005 | Naka et al. |
| 2005/0059494 A1 | 3/2005 | Kammler |
| 2005/0065810 A1 | 3/2005 | Bouron |
| 2005/0074028 A1 | 4/2005 | Wugofski |
| 2005/0091264 A1 | 4/2005 | Cameron et al. |
| 2005/0091290 A1 | 4/2005 | Cameron et al. |
| 2005/0091492 A1 | 4/2005 | Benson |
| 2005/0091495 A1 | 4/2005 | Cameron et al. |
| 2005/0108575 A1 | 5/2005 | Yung |
| 2005/0114447 A1 * | 5/2005 | Cameron et al. ............ 709/204 |
| 2005/0122926 A1 | 6/2005 | Cromer |
| 2005/0124320 A1 | 6/2005 | Ernst |
| 2005/0125677 A1 | 6/2005 | Michaelides |
| 2005/0125678 A1 | 6/2005 | Shaw |
| 2005/0149383 A1 | 7/2005 | Zacharia |
| 2005/0152544 A1 | 7/2005 | Kizawa |
| 2005/0172229 A1 | 8/2005 | Remo et al. |
| 2005/0182741 A1 | 8/2005 | Grossman |
| 2005/0183566 A1 | 8/2005 | Nash |
| 2005/0216405 A1 | 9/2005 | So |
| 2005/0283443 A1 | 12/2005 | Hardt |
| 2006/0005020 A1 | 1/2006 | Hardt |
| 2006/0005263 A1 | 1/2006 | Hardt |
| 2006/0010007 A1 | 1/2006 | Denman |
| 2006/0043164 A1 | 3/2006 | Dowling et al. |
| 2006/0080702 A1 | 4/2006 | Diez et al. |
| 2006/0104486 A1 | 5/2006 | Le Saint |
| 2006/0129509 A1 | 6/2006 | Gaines |
| 2006/0165060 A1 | 7/2006 | Dua |
| 2006/0174323 A1 * | 8/2006 | Brown et al. ............ 726/3 |
| 2006/0174350 A1 | 8/2006 | Roever |
| 2006/0200866 A1 | 9/2006 | Cameron |
| 2006/0206723 A1 | 9/2006 | Gil |
| 2006/0206724 A1 | 9/2006 | Schaufele |
| 2006/0224611 A1 | 10/2006 | Dunn |
| 2006/0253582 A1 | 11/2006 | Dixon et al. |
| 2006/0282670 A1 * | 12/2006 | Karchov ................ 713/175 |
| 2007/0011100 A1 * | 1/2007 | Libin et al. ............ 705/65 |
| 2007/0124269 A1 | 5/2007 | Rutter et al. |
| 2007/0124596 A1 | 5/2007 | Chevrel |
| 2007/0143835 A1 | 6/2007 | Cameron |
| 2007/0194884 A1 | 8/2007 | Didier et al. ............ 340/5.82 |
| 2007/0203852 A1 | 8/2007 | Cameron |
| 2007/0204168 A1 | 8/2007 | Cameron |
| 2007/0204325 A1 | 8/2007 | Cameron |
| 2007/0300183 A1 | 12/2007 | Anttila et al. |
| 2008/0028215 A1 | 1/2008 | Nanda |
| 2008/0034412 A1 | 2/2008 | Wahl |
| 2008/0103972 A1 | 5/2008 | Lanc |
| 2008/0178271 A1 | 7/2008 | Gajjala |
| 2008/0178272 A1 | 7/2008 | Gajjala |
| 2008/0184339 A1 | 7/2008 | Shewchuk |
| 2008/0289020 A1 | 11/2008 | Cameron |
| 2010/0227680 A1 | 9/2010 | Leopold et al. |
| 2010/0287369 A1 | 11/2010 | Monden |

FOREIGN PATENT DOCUMENTS

| | | |
|---|---|---|
| CN | 1589446 | 3/2005 |
| CN | 1794284 A | 6/2006 |
| EP | 0 767 418 A1 | 4/1997 |
| EP | 0 944 218 A1 | 9/1999 |
| EP | 1 471 685 | 10/2004 |
| EP | 1 729 480 A1 | 12/2006 |
| JP | 63-242751 A | 10/1988 |
| JP | 2001-344205 | 12/2001 |
| JP | 2005-38095 | 2/2005 |
| JP | 2005-518039 | 6/2005 |
| JP | 2006-524847 | 11/2006 |
| JP | 2010-517140 A | 5/2010 |
| JP | 2010-517176 A | 5/2010 |
| KR | 1020010110084 | 12/2001 |
| KR | 1020020096442 | 12/2002 |
| KR | 1020040048115 | 7/2004 |
| WO | WO 99/49614 | 9/1999 |
| WO | WO 01/29641 A2 | 4/2001 |
| WO | WO 03-053123 A2 | 7/2003 |
| WO | WO 2004/036348 A2 | 4/2004 |
| WO | WO 2004/044705 A2 | 5/2004 |
| WO | WO 2004/057796 A1 | 7/2004 |
| WO | WO 2007/097844 A1 | 8/2007 |

OTHER PUBLICATIONS

You, *Mobile Card Architecture for User Mobility and VHE in Heterogeneous Network Environments*, http://www.cnsr.info/Download/PDF/poster1.pdf., University of New Brunswick (2003) 2 pages.

Force, G., Sr., *Portable data encryption approaches*, http://ieeexplore.ieee.org/xpl/freeabs_all.jsp?arnumber=485417, Nat. Semicond. Corp., (1995) 1-page.

Lin et al., *A flexible biometrics remote user authentication scheme*, Tunghai University, (2004), 5 pages, http://islab.cis.thu.edu.tw/files/teacher/115.pdf.

Lee et al., *A Flexible Remote User Authentication Scheme Using Smart Cards*, Chaoyang University of Technology, pp. 46-52 http://delivery.acm.org/10.1145/570000/567335/p46-lee.pdf?key1=567335&key2=8102952511&coll=GUIDE&dl=GUIDE&CFID=912131&CFTOKEN=21372357.

"Valimo Mobile Identity Platform for Financial Services", [online], HP, Dec. 2006, pp. 1-4, http://h71028.www7.hp.com/ERC /downloads/4AA0-9344ENW.pdf.

A Guide to Integrating with InfoCard v1.0, Microsoft Corporation, pp. 1-62 (Aug. 2005).

A Technical Reference for InfoCard v1.0 in Windows, Microsoft Corporation, pp. 1-36 (Aug. 2005).

About Authentication, http://www.Microsoft.com/windows2000/en/server/iis/default.asp?url=/windows2000/en/server/iis/htm/core/iiabasc.htm, pp. 1-5, last updated Feb. 28, 2000.

Access Control Smart Card: Two-Factor Authentication for the Enterprise Logical Access Control for the Enterprise, pp. 1-2, printed on Jul. 12, 2006 from http://www.cardwerk.com/smart-card-solutions/logical-access-control/.

Andy Harjanto's InfoCard WebLog, MSDN Blogs, http://blogs.msdn.com/andyhar/archive/2005/11/22/495649.aspx, 3 pages (Nov. 22, 2005).

Audio-Visual Multimodal Fusion for Biometric Person Authentication and Liveness Verification; http://deliverFy.acm.org/10.1145/1160000/1151808/p17-chetty.pdf?key1=1151808&key2=9045972611&coll=GUIDE&dl=GUIDE&CFID=75919783&CFTOKEN=92791909; 2006; [8 pgs.].

Benjamin, Henry; CCIE Self-Study: Security Protocols, Extensible Authentication Protocol, Protected EAP, and Temporal Key Integrity Protocol, http://www.ciscopress.com/articles/article.asp?p=422947&seqNum=7&rl=1, Oct. 28, 2005, pp. 1-4.

Cameron, K.; "The Laws of Identity," Architect of Identity, Microsoft Corporation, pp. 1-12 (May 12, 2005).

Chappell; "Introducing Windows CardSpace" [online], MSDN, [retrieved on Nov. 27, 2007], Apr. 2006, pp. 1-18, http://msdn2.microsoft.com/en-us/library/aa480189.aspx#introinfocard_topic2.

Chappell; "Introducing Windows CardSpace" Apr. 2006, 2010 Microsoft Corporation, http://msdn.microsoft.com/en-us/library/aa480189(printer).aspx); 13 pgs.

Chappell; Introducing InfoCard, Apr. 2006, pp. 1-16, http://msdn.microsoft.com/winfx/reference/infocard/default.aspx?pull=/library/en-us/dnIong/html/introinfocard.asp.

Chinese Office Action cited in Application No. 200680047525.4 mailed Nov. 10, 2010; [12 pgs.].

Chinese Office Action cited in Application No. 200880002607.6 mailed Sep. 14, 2010; [34 pgs.].

Chinese Office Action cited in Application No. 200880003205.8 mailed Jun. 12, 2010; [25 pgs.].

Costa et al. "E-Services in Mission-Critical Organizations: Identification Enforcement," ICEIS 2004—Software Agents and Internet Computing, http://www-lih.univ-lehavre.fr/Intranet/proceedings/ICEIS2004/ICEIS%202004/Area%204%20-%20Software%20Agents%20and%20Internet%20Computing/Oral%20Presentations/Short%20Papers/C4_727_Costa.pdf. [8 pgs.].

Daemen et al., "The Identity metasystem: Towards a Privacy-Compliant Solution to the Challenges of Digital Identity"; Oct. 2006; Microsoft Corporation White Paper; [21 pgs.].

Ernst, Johannes. "What is Microsoft InfoCard?" Johannes Ernst's Blog, May 18, 2005, http://netmesh.info/jernst/digital_identity/what-is-microsoft-infocard; [4 pgs.].

European Examination Report cited in EP 06 838 382 7 mailed Nov. 19, 2009; [5 pgs.].

European Search Report cited in EP 06 838 382 7 mailed Sep. 18, 200; [11 pgs.].

Evans et al.; "Private key infrastructure: balancing computer transmission privacy with changing technology and security demans," Computer Standards & Interfaces, vol. 27, pp. 423-437 (2005).

Hunt, R.; "Technological infrastructure for PKI and digital certification," Computer Communications, vol. 24, pp. 1460-1471 (2001).

International Search Report and Written Opinion cited in PCT/US2006/045386 mailed Apr. 20, 2007; [11 pgs.].

International Search Report cited in PCT/EP 00/10284 mailed Aug. 20, 2001; [3 pgs.].

International Search Report cited in PCT/US2008/050204 mailed Jun. 12, 2008; [9 pgs.].

International Search Report cited in PCT/US2008/050205 mailed May 14, 2008; [12 pgs.].

International Search Report cited in PCT/US2008/051814 mailed Apr. 30, 2009; [3 pgs.].

Jones, "The Identity Metasystem: A User-Centric, Inclusive Web Authentication Solution", [online], Microsoft, 2005, pp. 1-27, http://www.w3.org/2005/Security/usability-ws/presentations/28-jones-id-metasystem.

Jøsang et al.; "What You See is Not Always What You Sign," Proceedings of AUUG2002, Melbourne, Australia, pp. 1-13 (Sep. 4-6, 2002).

Lancaster et al.; "Public key infrastructure: a micro and macro analysis," Computer Standards & Interfaces, vol. 25, pp. 437-446 (2003).

Liberty Alliance Project Whitepaper: Personal Identity, Mar. 23, 2006, pp. 1-13.

Nakamura et al. "Model-Driven Security Based on a Web Services Security Architecture," Proceedings of the 2005 IEEE International Conference on Services Computing (Scc'05), Jul. 15, 2005; [9 pages].

Q&A: Microsoft's Kim Cameron Wins 'Balancing Innovation and Reality' Award for Contributions to Digital Identity, Microsoft PressPass, 3 pages (May 12, 2005).

"Strong Authentication on Mobile Devices Leveraging the OATH Open Framework" [online], Diversinet, May 10, 2005, pp. 1-17, http://conference.digitalidworld.com/2005/attendees/slides/Sea_C_0510_1330a.pdf.

The fusion framework in a person identity verification system based on face and speech data http://ieeexplore.ieee.org/search/srchabstract.jsp?arnumber=1557132&isnumber=33117&punumber=10384&k2dockey=1557132@ieeecnfs&query=%28++identity+verification%3Cin%3Ede%29&pos=14; May 2005; [4 pgs.].

U.S. Office Action cited in U.S. Appl. No. 11/312,920 mailed Apr. 15, 2009; [15 pgs.].

U.S. Office Action cited in U.S. Appl. No. 11/312,920 mailed Dec. 31, 2009; [16 pgs.].

U.S. Office Action cited in U.S. Appl. No. 11/312,920 mailed Sep. 8, 2009; [11 pgs.].

U.S. Office Action cited in U.S. Appl. No. 11/361,281 mailed Aug. 16, 2010; [16 pgs.].

U.S. Office Action cited in U.S. Appl. No. 11/361,281 mailed Jan. 21, 2010; [14 pgs.].

U.S. Office Action cited in U.S. Appl. No. 11/361,281 mailed Jun. 23, 2009; [19 pgs.].

U.S. Office Action cited in U.S. Appl. No. 11/495,830 mailed Aug. 30, 2010; [17 pgs.].

U.S. Office Action cited in U.S. Appl. No. 11/495,830 mailed Jul. 16, 2009; [14 pgs.].

U.S. Office Action cited in U.S. Appl. No. 11/495,830 mailed Mar. 3, 2010; [17 pgs.].

U.S. Office Action cited in U.S. Appl. No. 11/856,617 mailed Sep. 13, 2010; [24 pgs.].

U.S. Office Action cited in U.S. Appl. No. 11/856,636 mailed Oct. 7, 2010; [19 pgs.].

U.S. Office Action cited in U.S. Appl. No. 11/952,890 mailed Oct. 7, 2010; [10 pgs.].

U.S. Appl. No. 11/312,920 filed Dec. 19, 2005 entitled "Security Tokens Including Displayable Claims"; [33 pgs.].

U.S. Appl. No. 11/361,281 filed Feb. 24, 2006 entitled "Identity Providers in Digital Identity System"; [37 pgs.].

U.S. Appl. No. 11/495,830 filed Jul. 28, 2006 entitled "Personal Identification Information Schemas"; [45 pgs.].

U.S. Appl. No. 11/749,020 filed May 15, 2007 entitled "Identify Tokens Using Biometric Representations"; [40 pgs.].
U.S. Appl. No. 11/856,617 filed Sep. 17, 2007 entitled "Provisioning of Digital Identity Representations"; [38 pgs.].
U.S. Appl. No. 11/856,636 filed Sep. 17, 2007 entitled "Provisioning of Digital Identity Representations"; [36 pgs.].
U.S. Appl. No. 11/952,890 filed Dec. 7, 2007 entitled "Remote Access of Digital Identities"; [31 pgs.].
Von Welch et al. "Security for Grid Services," Proceedings of the 12th IEEE International Symposium on High Performance Distributed Computing (HPDC'03), Jun. 24, 2003. [10 pgs.].
Wireless Application Forum, Ltd. "WAP Provisioning Smart Card," Jul. 10, 2001, http://simon.dehartog.nl/datasheets/protocols/WAP/WAP-186-PROVSC-20010710-a.pdf. [37 pgs.]. IThanhnga Truonci 03/13112011 Considered Except Where Lined Through. /Tbt/ References.
Chinese Office Action cited in Application No. 200780006584.1 mailed Aug. 4, 2010.
Computations. (2001), In Chambers 21st Century Dictionary, London: Chambers Harrap., Retrieved May 26, 2009 from <http://www.credoreference.com/entry/chambdict/computational>.
Display. (2000), In Collins English Dictionary, London: Collins, Retrieved May 26, 2009 from <http://wvvw.credoreference.com/entry/hcengdict/display>.
Fahrenholtz et al., "Transactional Security for a Distributed Reputation Manaement System", Lecture Notes in Computer Science, vol. 2455, 2002.
International Search Report and Written Opinion cited in PCT/US2007/001362 mailed Jun. 27, 2007.
Maximilien et al., "Conceptual Model of Web Service Reputation", ©2002, pp. 1-6.
Maximilien et al., "Reputation and Endorsement for Web Services", ACM Inc. printed Dec. 9, 2005.
Menezes et al., "Handbook of Applied Cryptography", CRC Press, 1996, Chapter 11 included; available at <http://www.cacr.math.uwaterloo.ca/hac>.
Party. (2004), In Roget's II The New Thesaurus, Boston, MA: Houghton Mifflin, <http://www.credoreference.com/entry/hmrogets/party>.
Resnick et al., "ACM Portal, the ACM Digital Library", Reputation Systems, vol. 43, No. 12, http://delivery.acm.org/10.1145/ 360000/355122/p45-resnick.html?key1+355122&key2=18 . . . (2000).
Supplementary European Search Report and Opinion cited in Application No, PCT/US2007001362 mailed Oct. 7, 2009.
Techtree News Staff, "Infocard Spells End of Passwords." Techtree.com India, Feb. 16, 2006, 2 pgs.
Token. (2000), In Collins English Dictonary, London: Collins, <http://www.credoreference.com/entry/hcengdict/token>.
U.S. Office Action cited in U.S. Appl. No. 11/361,857 mailed Nov. 10, 2008.
U.S. Office Action cited in U.S. Appl. No. 11/361,857 mailed May 29, 2009.
U.S. Office Action cited in U.S. Appl. No. 11/361,857 mailed Oct. 14, 2009.
U.S. Office Action cited in U.S. Appl. No. 11/361,857 mailed Mar. 31, 2010.
U.S. Office Action cited in U.S. Appl. No. 11/749,020 mailed Dec. 27, 2010.
You, Mobile Card Architecture for User Mobility and VHE in Heterogeneous Network Environments, http://www.cnsr.info/Download/PDF/posterl.pdf., University of New Brunswick (2003) 2 pages.
Chinese Notice of First Office Action in The State Intellectual Property Office of the People's Republic of China, re Application No. 200880002693.0, mailed Jan. 12, 2011, 22 pages.
European Communication from Search Division, cited in Application No. 08 713 521.6, mailed Apr. 11, 2011, 2 pp.
European Communication from Search Division, cited in Application No. 08 713 522.4, mailed Apr. 11, 2011, 2 pp.
Notice of Allowance cited in U.S. Appl. No. 11/312,920, mailed Jun. 22, 2010, 9 pp.
Notice of Allowance cited in U.S. Appl. No. 11/361,281, mailed Apr. 28, 2011, 22 pp.
Notice of Allowance cited in U.S. Appl. No. 11/361,281, mailed Dec. 8, 2010, 20 pp.
Notice of Allowance cited in U.S. Appl. No. 11/495,830, mailed Apr. 19, 2011, 17 pp.
Notice of Allowance cited in U.S. Appl. No. 11/495,830, mailed May 26, 2011, 9 pp.
Notice of Allowance cited in U.S. Appl. No. 11/856,617, mailed Mar. 29, 2011, 16 pp.
Response to Communication from Chinese Intellectual Property Office re Application No. 200880003205.8, filed Dec. 12, 2010, 28 pp.
Response to Communication from Chinese Intellectual Property Office re Application No. 200680047525.4, filed Mar. 7, 2011, 14 pp.
Response to Communication from Chinese Intellectual Property Office re Application No. 200880002607.6, filed Jan. 13, 2011, 21 pp.
Response to Communication from Chinese Intellectual Property Office re Application No. 200880002693.0, filed May 12, 2011, 14 pp.
Response to European Communication re Ep Application No. 06838382.7, filed Mar. 29, 2010 , 14 pp.
Response to European Communication re Ep Application No. 07748971.4, filed May 25, 2010 , 13 pp.
U.S. Office Action cited in U.S. Appl. No. 11/856,636, mailed May 4, 2011, 25 pp.
U.S. Office Action cited in U.S. Appl. No. 11/952,890, mailed Apr. 8, 2011, 21 pp.
U.S. Office Action Response cited in U.S. Appl. No. 11/312,920, filed Jul. 15, 2009, 13 pgs.
U.S. Office Action Response cited in U.S. Appl. No. 11/312,920, filed, Nov. 6, 2009, 11 pgs.
U.S. Office Action Response cited in U.S. Appl. No. 11/312,920, filed Mar. 31, 2010, 12 pgs.
U.S. Office Action Response cited in U.S. Appl. No. 11/361,281, filed Sep. 23, 2009, 14 pgs.
U.S. Office Action Response cited in U.S. Appl. No. 11/361,281, filed Apr. 21, 2010, 12 pgs.
U.S. Office Action Response cited in U.S. Appl. No. 11/361,281, filed Nov. 16, 2010, 15 pgs.
U.S. Office Action Response cited in U.S. Appl. No. 11/361,857, filed Feb. 10, 2009, 15 pgs.
U.S. Office Action Response cited in U.S. Appl. No. 11/361,857, filed Jul. 29, 2009, 6 pgs.
U.S. Office Action Response cited in U.S. Appl. No. 11/361,857, filed Sep. 29, 2009, 10 pgs.
U.S. Office Action Response cited in U.S. Appl. No. 11/361,857, filed Dec. 30, 2009, 9 pgs.
U.S. Office Action Response cited in U.S. Appl. No. 11/361,857, filed Jun. 30, 2010, 6 pgs.
U.S. Office Action Response cited in U.S. Appl. No. 11/495,830, filed Nov. 16, 2009, 15 pgs.
U.S. Office Action Response cited in U.S. Appl. No. 11/495,830, filed May 3, 2010, 13 pgs.
U.S. Office Action Response cited in U.S. Appl. No. 11/495,830, filed Nov. 20, 2010, 14 pgs.
U.S. Office Action Response cited in U.S. Appl. No. 11/749,020, filed Mar. 28, 2011, 11 pgs.
U.S. Office Action Response cited in U.S. Appl. No. 11/856,617, filed Dec. 13, 2010, 16 pgs.
U.S. Office Action Response cited in U.S. Appl. No. 11/856,636, filed Feb. 1, 2011, 16 pgs.
Chinese 2nd Office Action cited in Application No. 200880002607.6 dated Mar. 22, 2011, 16 pgs.
Notice of Allowance cited in U.S. Appl. No. 11/361,281 mailed May 25, 2011, 22 pgs.
U.S. Office Action cited in U.S. Appl. No. 11/749,020 mailed Jun. 10, 2011, 30 pgs.
Chinese 2nd Office Action mailed in Application No. 200680047525.4 mailed Apr. 20, 2011, 11 pgs.
European Communication re Ep Application No. 07748971.4, mailed Jan. 20, 2010, 5 pp.
International Search Report cited in PCT/US2008/062521 mailed Sep. 22, 2008, 10 pgs.

Notice of Allowance/Decision to Grant in Russian Application No. 2008124907 mailed Jan. 24, 2011, 5 pages, English translation.

U.S. Office Action Response cited in U.S. Appl. No. 11/856,617 mailed May 23, 2011, 6 pgs.

U.S. Office Action Response in U.S. Appl. No. 11/952,890 mailed Jul. 8, 2011, 12 pgs.

U.S. Office Action Response mailed in U.S. Appl. No. 11/952,890 mailed Jan. 7, 2011, 15 pgs.

Chinese Third Office Action Decision on Rejection mailed in Application No. 200880002607.6 mailed Jul. 26, 2011, 17 pgs.

Chinese Office Action mailed in Application No. 200880015890.6 mailed Jul. 20, 2011, 10 pgs.

Chinese 2nd Office Action in Application 2008800026930 mailed Sep. 7, 2011, 9 pgs.

Chinese 2nd Office Action in Application 2007800065841 mailed Sep. 7, 2011, 9 pgs.

Chinese 2nd Office Action cited in Application Cn 200880002693, 0 mailed Sep. 7, 2011, 7 pgs.

European Communication and Supplemental Search Report in Application No. 08 713 522.4 mailed Jul. 25, 2011, 9 pgs.

European Communication and Supplemental Search Report re EP Application No. 08713521.6, mailed Jul. 20, 2011, 6 pgs.

Japanese Notice of Rejection in Application 2008545618 mailed Sep. 13, 2011, 4 pgs.

NOA cited in U.S. Appl. No. 11/856,617 mailed Aug. 31, 2011, 7 pgs.

NOA cited in U.S. Appl. No. 11/361,281, mailed Aug. 18, 2011, 10 pgs.

Notice of Allowance cited in U.S. Appl. No. 11/495,830 mailed Oct. 5, 2011, 7 pgs.

U.S. Office Action cited in U.S. Appl. No. 11/749,020 mailed Oct. 5, 2011, 18 pgs.

U.S. Office Action cited in U.S. Appl. No. 11/856,636 mailed Oct. 14, 2011, 15 pgs.

Japanese Notice of Rejection in Application 2008-556319 mailed Sep. 22, 2011, 7 pgs. 27488 Patent Trademark Office.

* cited by examiner

FIG. 6

PORTABLE PERSONAL IDENTITY INFORMATION

RELATED APPLICATIONS

This application is intended to advance the art disclosed in U.S. patent application entitled, "IDENTITY PROVIDERS IN DIGITAL IDENTITY SYSTEM," Ser. No. 11/361,281 by inventors Cameron et al., and filed Feb. 24, 2006 and is hereby incorporated by reference.

BACKGROUND

Electronic communications are commonplace in modern society. Often there is a need for a communicating party to ensure the identity of another party. This may be a prerequisite to authorizing the communicating party to access restricted resources, such as transaction interface, device, data repository, and so forth. As encryption technology has improved, it has became increasingly difficult for an unauthorized party to intercept messages, however another communication vulnerability has came to light. This vulnerability is the result of a malicious party forging the identity of a legitimate party, wherein another party is lured into divulging sensitive information by believing the malicious party is the legitimate party.

A user may possess identifying information on a client, which when presented to a relying party provides convincing evidence that the client is who they claim to be. Having such information available on a client facilitates identification, however, a user may wish to be identified on more than one client, such as when a user selects a client from a pool of clients or transitions to another client. Recreating and/or regenerating the identifying information each time a requesting party selects a different client is a burdensome task.

SUMMARY

This Summary is provided to introduce a selection of concepts in a simplified form that are further described below in the Detailed Description. This Summary is not intended to identify key features or essential features of the claimed subject matter, nor is it intended to be used to limit the scope to the claimed subject matter.

A requesting party (hereinafter, "principal") requests to be identified by a resource with at least one portion being secured (hereinafter, "relying party") by providing the relying party with identifying information (hereinafter, "claims"). The request may be a preliminary component to the principal obtaining access to a restricted resource protected by the relying party. The relying party then evaluates the claims and, if appropriate, authorizes the principal's access to the secured resource, such as a transaction interface or data repository.

Porting claims from one client to another facilitates identification of the principal without requiring use of a specific client or the regeneration and/or reacquisition of the claims on a subsequent client. Porting the claims is accomplished by binding together a number of claims with associated metadata and backing data. Once bound, the claims, metadata, and backing data are sent to a receiving client.

The principal includes human users and electronic agents, such as software agents, devices, and hardware components. The relying party includes webpages, websites, devices, device portions, commands, command interfaces, or other software or hardware with a secured portion.

DETAILED DESCRIPTION

Figure 1:
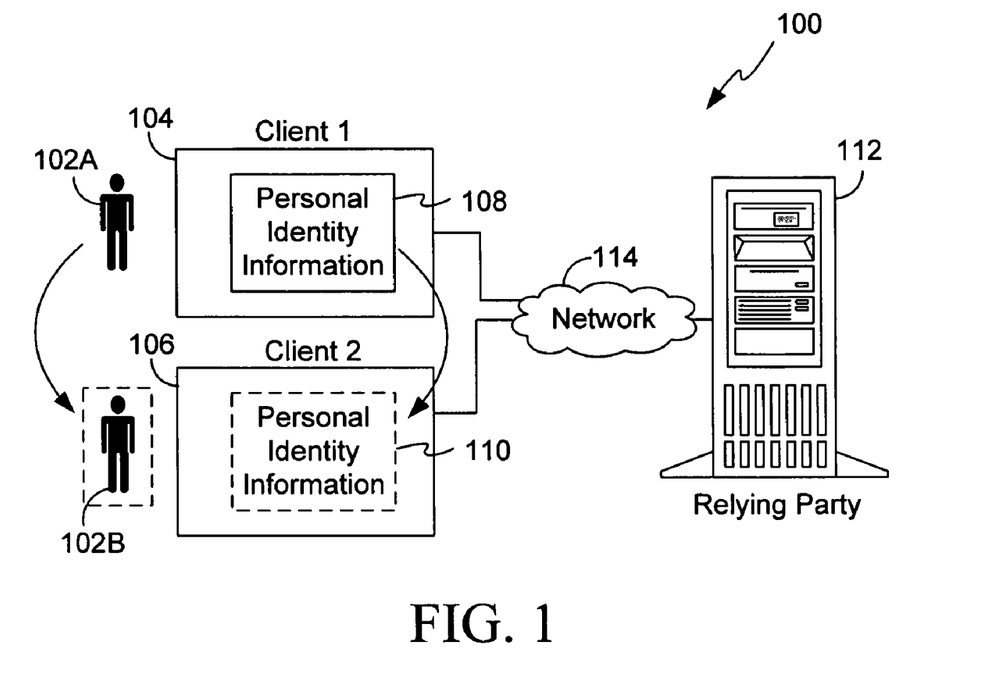
FIG. 1 illustrates a first example system for porting personal identification information.

FIG. 1 illustrates first example system 100 for porting personal identification information 108. User 102A is able to be identified by relying party 112 from client 1 (104) with portions of personal identity information 108. In one embodiment, the portion of personal identity information 108 utilized for identification is the claims.

User 102A initially selects client 1 (104) to interface with and subsequently selects client 2 (106), thereby becoming user 102B. To facilitate identification of user 102B by relying party 112, without regeneration or reacquisition of personal identity information 110, client 1 (104) ports personal identity information 108 to client 2 (106) to become personal identity information 110. As a result, user 102B, now interfacing with client 2 (106), may be identified by relying party 112. Network 114 facilitates communication between relying party 112 and client 1 (104) and client 2 (106), optionally network 114 facilitates communication between client 1 (104) and client 2 (106). Network 114 is a communication medium and may be embodied in one or more of the following: bus, LAN, WAN, intranet, the Internet, telephone, wireless, and other systems operable to convey data signals between clients.

Figure 2:
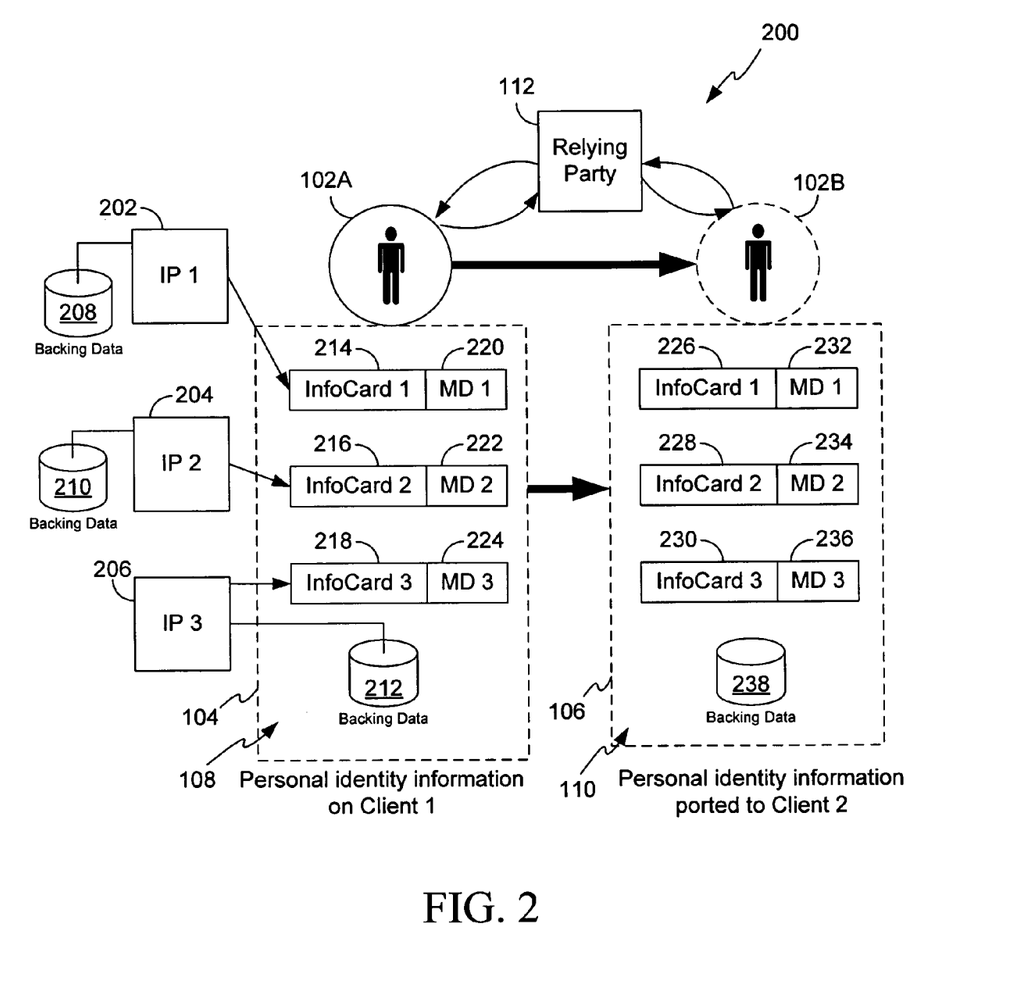
FIG. 2 illustrates a second example system for porting personal identification information.

FIG. 2 illustrates second example system 200 for porting personal identification information. User 102A initially selects client 1 (104) to interface with and subsequently selects client 2 (106), thereby becoming user 102B. Personal identity information 108 is ported to personal identity information 110 on client 2 (106).

For purposes of illustration and discussion, and without limitation, three InfoCards, each with associated metadata, are illustrated and described. It will be understood by those skilled in the art that the number of InfoCards may vary without departing form the spirit and scope of the invention, provided at least one InfoCard is "self issued," such as Info-Card 3 (218).

InfoCards are variously embodied and generally included identity information. More specifically, InfoCards represent a token issuance relationship between a principal, such as user 102, and a particular identity provider, such an identity providers 1, 2, 3 (202, 204, 206).

InfoCards 214, 216, 218 can include, among other information, the identity provider's issuance policy for security tokens, including the type of tokens that can be issued, the claim types for which it has authority, and/or the credentials to use for authentication when requesting security tokens. In example embodiments, InfoCards 214, 216, 218 are represented as XML documents that are issued by identity providers 202, 204, 206 and stored by principals, such as user 102, on a storage device such as within client 104.

A further discussion of claims and InfoCards is provided in co-pending patent application "IDENTITY PROVIDERS IN DIGITAL IDENTITY SYSTEM," U.S. Ser. No. 11/361,281, which is expressly incorporated herein by reference.

The data within an InfoCard that provides identity data of the principal are known as claims. InfoCards 214, 216, 218, 226, 228, 230 preferably each contain at least one claim with identifying data. Claims are generated by an identity provider and provide a statement or assertion made about the principal related to the principal's identity or information about the principal such as, for example, name, address, social security number, age, etc. Claims may be an individual datum (e.g., "over 21=True"), a plurality of data (e.g., address of residence), and one or more claims may be bundled in a claim bundle.

It is understood that the use of the plural term "claims," herein, shall not exclude claim bundles unless explicitly stated. It is also understood that the use of the singular term "claim," herein, shall not exclude single claims within such a claim bundle unless explicitly stated. It is further understood that the use of the term "InfoCard" shall refer to a container operable to hold one or more claims within a structure, the structure optionally including additional data (e.g., "name of the InfoCard," "creator of the InfoCard"). Additional background on claims is found in the incorporated Ser. No. 11/361,281 patent application (see above).

Claims may be missing, incomplete, or erroneous such as when claims are awaiting population by identity providers 1, 2, 3 (202, 204, 206), empty, or forged. Relying party 112 receiving less than all required claims, claims that are incomplete, or claims that are otherwise erroneous, would at least decline to identify user 102.

InfoCard 1 (214) contains claims provided by identity provider 1 (202). Identity provider 1 (202) accesses backing data 208 containing data utilized in the generation of claims for InfoCard 1 (214). Similarly, InfoCard 2 (216) contains claims provided by identity provider 2 (204). Identity provider 2 (204) accesses backing data 210 containing data utilized in the generation of claims for InfoCard 2 (216). In one embodiment, backing data 208, 210 contains claim source data (e.g., social security number, passport, frequent flier program number, data of birth, et cetera). In another embodiment, backing data 208, 210 contains cryptographic source data (e.g., keys, encryption methodology, seed values, et cetera).

Information provider 3 (206) generates the claims for InfoCard 3 (218). In one embodiment, information provider 3 (206) is user 102. In another embodiment, identity provider 3 (206) operates under the control of user 102 and accesses backing data 212, which is also under the control of user 102, to produce self-issued InfoCard 3 (218). In one embodiment, self-issued InfoCard 3 (218) contains claims that are difficult for non-user controlled identity providers, such as identity providers 1 and 2 (202, 204), to provide accurately. For example, a preferred email address or current phone number may not be accurately reflected in stale repositories, such as backing data 208, 210. In another embodiment, self-issued InfoCard 3 (218) contains claims that are deemed to be less sensitive thereby making interaction with third-party identity providers, such as identity providers 1 and 2 (202, 204), uneconomical. For example, when claim data is publicly available or when relying party 112 would prefer or require claims generated from data controlled by user 102, such as to obtain a future mailing address, user-controlled backing data 212 is utilized for generating InfoCard 3 (218) and self-generated claims therein. In yet another embodiment, backing data 212 contains cryptographic data (e.g., public keys, private keys, encryption methodology, seed values).

Metadata 1, 2, 3, (220, 222, 224) is logically appended to InfoCard 1, 2, 3 (214, 216, 218), respectively. In one embodiment, metadata 1, 2, 3, (220, 222, 224) provides implementation specific descriptors associated with their respective InfoCards 214, 216, 218. In another embodiment, at least one of metadata 1, 2, 3 (220, 222, 224) is a cryptographic descriptor (e.g., decryption methodology, parameters, time stamps) associated with at least one encrypted claim within a respective InfoCard 1, 2, 3 (214, 216, 218). In another embodiment, at least one of metadata 1, 2, 3, (220, 222, 224) is a claim descriptor (e.g., name, purpose, source, time stamp) associated with at least one claim within a respective InfoCard 1, 2, 3 (214, 216, 218).

User 102A is able to request identification from relying party 112 by providing claims of personal identity information 108 located on client 1 (104). When user 102A wishes to be identified by relying party 112 via client 2 (106), personal identity information 108 is ported to client 2 (106). Accordingly, personal identity information (108) on client 1 (104) is bound and sent to client 2 (106) to become personal identity information 110, comprising InfoCards 1, 2, 3 (226, 228, 230), backing data 238, and metadata 1, 2, 3 (220, 222, 224). It is understood that "sending," refers to the copying of data to a destination and optionally deleting the data from the source, as well as, physically moving a medium with the data thereon. Binding personal identity information 108 ties together info-Cards 1, 2, 3 (214, 216, 218), metadata 1, 2, 3 (220, 222, 224), and backing data 212 and is more fully discussed in the embodiments that follow.

Figure 3:
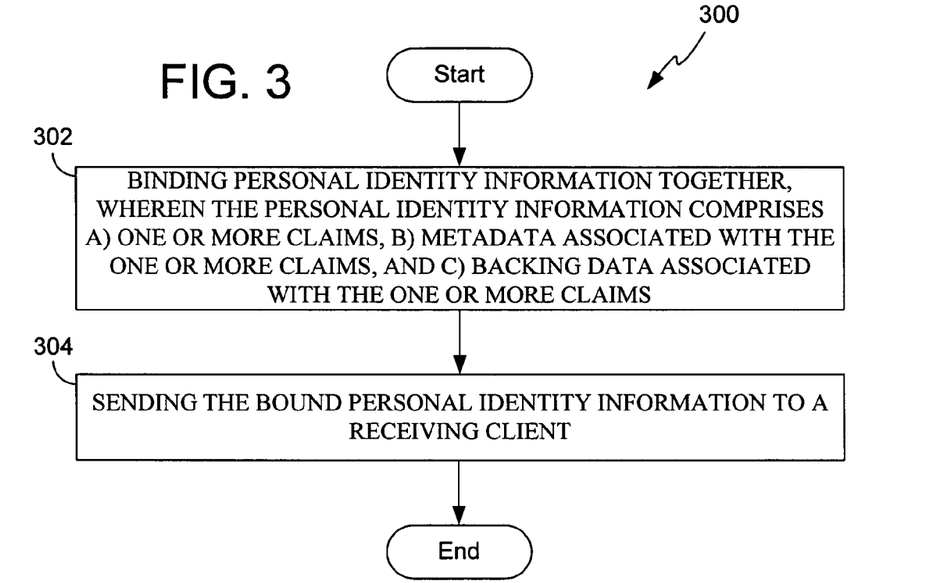
FIG. 3 illustrates a first example method for porting personal identification information.

FIG. 3 illustrates first example method 300 for porting personal identification information. The method 300 begins at binding operation 302. According to an embodiment, binding operation 302 binds together personal identity information, wherein the personal identity information comprises 1) one or more claims, 2) metadata associated with the one or more claims, and 3) backing data associated with the one or more claims. Binding is the associating of data elements into one data element, and as discussed in the embodiments below, includes associating the data elements themselves or indicia of the location of the data elements.

In one embodiment, binding operation 302 incorporates a container to bind at least one claim, metadata, and backing data. The container is variously embodied and includes object-oriented objects, data structures, database records, database tables, files, and other structures operable to contain claims, metadata, and backing data. In further embodiments, the container is embodied within at least one claim, metadata, and/or backing data. In another embodiment, the container is distinct from the claims, metadata, and backing data.

In one embodiment, the container encapsulates the bound personal identity information. In a further embodiment, the encapsulated bound personal identity information is a copy of the at least one claim, metadata, and backing data. In another embodiment, the container binds by maintaining links (e.g., addresses, pointers, file names, URIs, URLs, et cetera) to the bound personal identity information.

Method 300 then proceeds to sending operation 304. According to an embodiment, sending operation 304 sends the bound personal identity information, bound in operation 302, to a receiving client, such as client 106 of FIG. 2. Sending operation 304 is variously embodied and includes reading the bound personal identity information and transmitting a copy of the bound personal identity information to the receiving client. In a further embodiment, the original bound personal identity information is deleted after sending operation 304 is complete. In further embodiments, a receiving client signals the successful reception of the bound personal identity information as a prerequisite to the deletion of the bound personal identity information located on the sender.

In yet another embodiment, sending operation 304 sends the bound personal identity information to receiving client which is a medium for data storage. In another embodiment, sending operation 304 is the physical moving of a medium, with the bound personal identity information encoded therein, from an originating client to the receiving client. The medium then being physically and communicatively attached to the receiving client.

In another embodiment, the personal identity information is standardized prior to sending 304. Standardization is variously embodied to include standardization for language, computing platform (e.g., operating system), and personal identity information format standards. In another embodiment, the personal identity data is encrypted prior to sending 304.

In a further embodiment, sending operation 304 traverses a container having links to portions of the bound personal identity information and then sends the bound personal identity information identified by the links.

Figure 4:
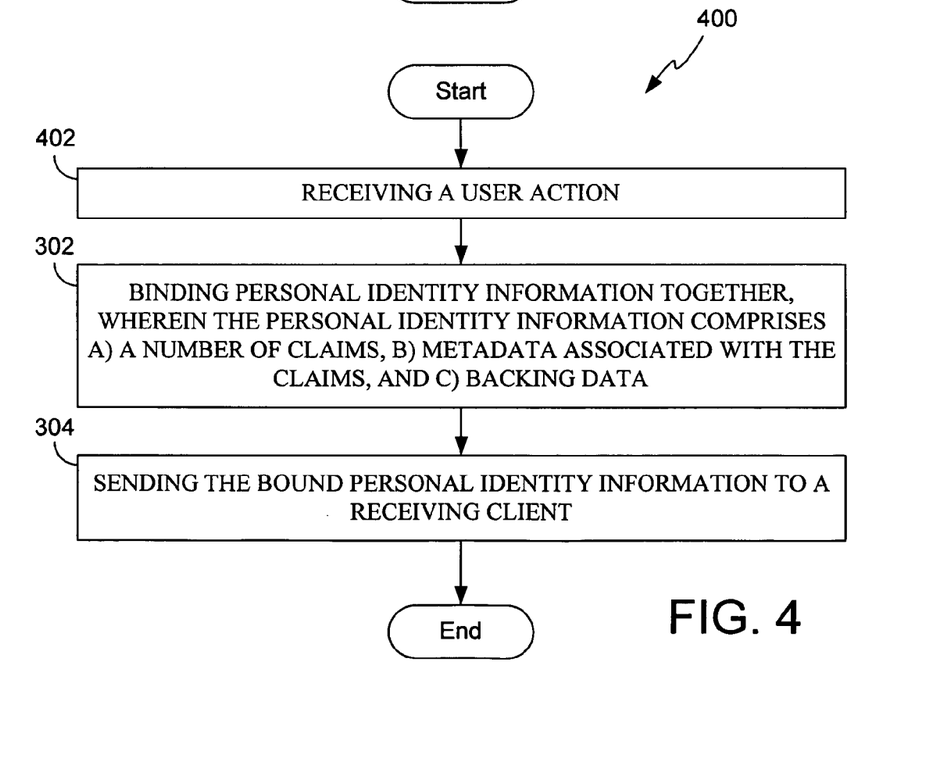
FIG. 4 illustrates a second example method for porting personal identification information.

FIG. 4 illustrates second example method 400 for porting personal identification information. At receiving operation 402 a user action triggers binding operation 302 and sending operation 304. According to one embodiment, the received user action in operation 402 is a direct command, such as to expressly instruct a computer to perform binding operation 302 and sending operation 304. In other embodiments, receiving operation 402 is an indirect command, such as a command with another primary purpose. Examples of user actions that are indirect commands include: initiating a data backup operation, inserting a removable storage medium, requesting removal of a removable storage medium, connecting to a peer client, requesting disconnect to a peer client, or other action which is determined to be associated with a user changing to another client or otherwise indicating a potential desire to be identified on another client.

Figure 5:
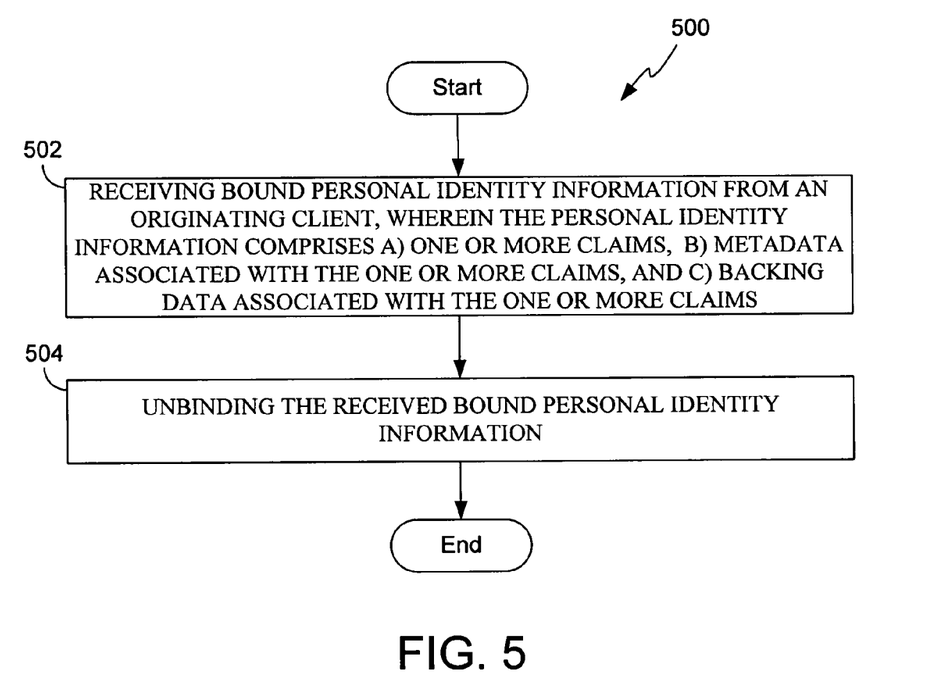
FIG. 5 illustrates an example method for receiving ported personal identification information.

FIG. 5 illustrates example method 500 for receiving ported personal identification information. Method 500 includes receiving operation 502 for receiving bound personal identity information from an originating client, wherein the personal identity information comprises 1) one or more claims, 2) metadata associated with the one or more claims, and 3) backing data associated with the one or more claims.

Receiving operation 502 is variously embodied and includes receiving an email, file, instant message, inter-process message, data packet(s), or other communication containing bound personal identity information. In another embodiment, receiving operation is the communicative and physical attachment of a medium with the bound personal identity information stored thereon.

In another embodiment, receiving operation 502 is associated with the logical and physical attachment of removable storage to the receiving client. The removable storage medium having bound personal identity information encoded thereon.

In a further embodiment, receiving operation 502, upon successfully receiving the bound personal identity information, signals the originating client of the receipt of the bound personal identity information.

Method 500 then continues to unbinding operation 504. Unbinding operation 504 extracts at least one claim and, preferably, extracts all claims from the bound personal identity information, metadata, and backing data.

The received bound personal identity information may require additional processing to be usable by the receiving client. Accordingly, in one embodiment, receiving operation 502 further comprises decrypting the bound personal identity information. In a further embodiment, decryption occurs after unbinding operation 502, wherein at least one of the 1) at least one claim, 2) metadata associated with the at least one claim, and 3) backing data associated with the at least one claim is encrypted.

In another embodiment, method 500 further comprises locally storing the personal identity information.

Method or step embodiment of the invention are optionally embodied as computer-readable mediums having computer-executable instructions for performing the said methods or steps.

Figure 6:
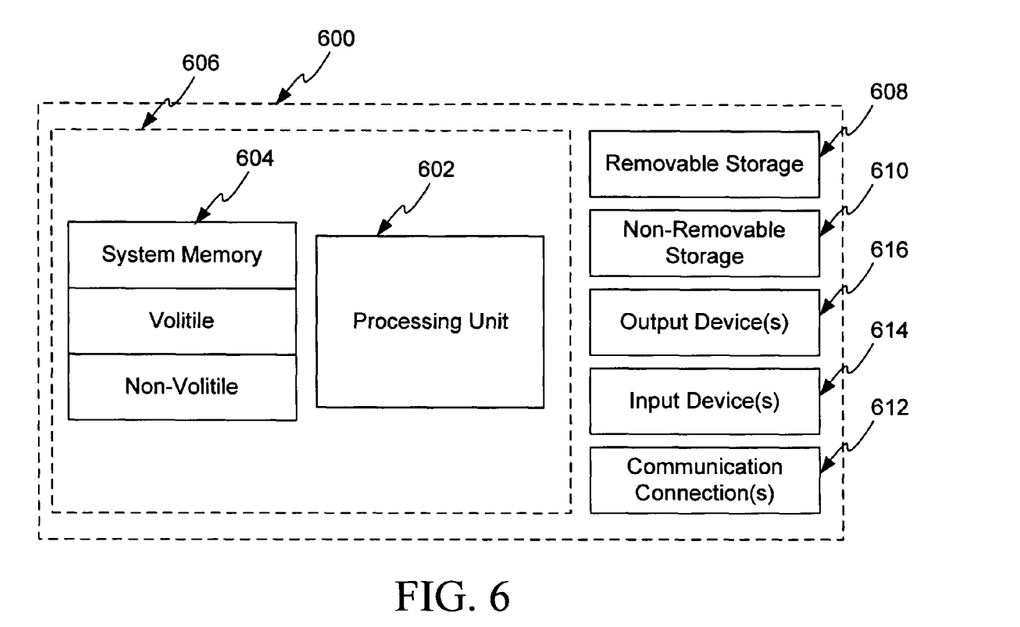
FIG. 6 illustrates an example suitable computing system environment on which embodiments of the present invention may be implemented.

FIG. 6 illustrates an example of a suitable computing system environment on which embodiments of the present invention may be implemented. This system 600 is representative of computing systems that may be used to run software applications for possessing or porting personal identity information. In its most basic configuration, system 600 typically includes at least one processing unit 602 and memory 604. Depending on the exact configuration and type of computing device, memory 604 may be volatile (such as RAM), non-volatile (such as ROM, flash memory, etc.) or some combination of the two. This most basic configuration is illustrated in FIG. 6 by dashed line 606. Additionally, system 600 may also have additional features/functionality. For example, device 600 may also include additional storage (removable and/or non-removable) including, but not limited to, magnetic or optical disks or tape. Such additional storage is illustrated in FIG. 6 by removable storage 608 and non-removable storage 610.

Computer storage media includes volatile and nonvolatile, removable and non-removable media implemented in any method or technology for storage of information such as computer readable instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 600. Any such computer storage media may be part of system 600.

System 600 may also contain communications connection(s) 612 that allow the system to communicate with other devices. Communications connection(s) 612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System 600 may also have input device(s) 614 such as keyboard, mouse, pen, voice input device, touch input device, etc. Output device(s) 616 such as a display, speakers, printer, etc. may also be included. All these devices are well know in the art and need not be discussed at length here.

It should be noted that the specific details described are not intended to limit the scope of the invention and are provided for illustrative purposes only.

What is claimed is:

1. A computer-implemented method for porting personal identity information of a principal from a first client to a second client, comprising:
   receiving selection of the first client;
   requesting identification of the principal by a relying party by providing personal identity information located on the first client to the relying party, wherein the personal identity information comprises a) one or more claims, b) metadata associated with the one or more claims, and c) backing data associated with the one or more claims;
   receiving selection of the second client;
   binding, by a processor, the personal identity information located on the first client, wherein the binding ties together the one or more claims, metadata, and backing data;
   sending, by the processor, the bound personal identity information to the second client, wherein the sending the bound personal identity information comprises transmitting a copy of the bound personal identity information to the second client; and
   deleting the bound personal identity information on the first client after sending the bound personal identity information to the second client.

2. The computer-implemented method of claim 1, wherein the binding of the personal identity information occurs in response to a received user-action.

3. The computer-implemented method of claim 1, wherein:
   the binding the personal identity information further comprises binding the personal identity information together with a container; and
   wherein the sending the bound personal identity information further includes sending the container.

4. The computer-implemented method of claim 3, wherein the binding further comprises incorporating the personal identity information into the container.

5. The computer-implemented method of claim 1, further comprising encrypting the personal identity information prior to sending.

6. The computer-implemented method of claim 5, wherein encrypting the personal identity information further comprises encrypting the bound personal identity information.

7. The computer-implemented method of claim 1, further comprising standardizing the personal identity information prior to sending.

8. The computer-implemented method of claim 1, further comprising after sending the bound personal identity information, marking the personal identity information as sent.

9. A computer-implemented method for receiving ported personal identity information of a principal at a receiving client from an originating client, the method comprising:
   receiving, at the receiving client, bound personal identity information from the originating client, wherein the bound personal identity information comprises a) one or more claims generated by an identity provider, b) metadata associated with the one or more claims, and c) backing data associated with the one or more claims, and wherein the one or more claims, metadata, and backing data are tied together, wherein the bound personal identity information received at the receiving client comprises a copy of the bound personal identity information located on the originating client;
   unbinding, by a processor, the received bound personal identity information, wherein the unbinding extracts at least one claim from the bound personal identity information; and
   requesting identification of the principal by a relying party, via the receiving client, by providing the extracted bound personal identity information to the relying party.

10. The computer-implemented method of claim 9, further comprising locally storing the received bound personal identity information.

11. The computer-implemented method of claim 9, further comprising upon receiving the bound personal identity information, signaling the originating client.

12. The computer-implemented method of claim 9, further comprising decrypting the bound personal identity information when encrypted.

13. The computer-implemented method of claim 9, further comprising localizing standardized personal identity information.

14. A computer-readable storage medium having encoded thereon computer-executable instructions that when executed perform a computer process for porting personal identification information of a principal from a first client to a second client, the computer process comprising:
   receiving selection of the first client;
   requesting identification of the principal by a relying party by providing personal identity information located on the first client to the relying party, wherein the personal identity information comprises a) one or more claims, wherein the one or more claims are generated by an identity provider, b) metadata associated with the one or more claims, and c) backing data associated with the one or more claims;
   receiving selection of the second client;
   binding the personal identity information located on the first client, wherein the binding ties together the one or more claims, metadata, and backing data;
   sending the bound personal identity information to the second client, wherein the sending the bound personal identity information comprises transmitting a copy of the bound personal identity information to the second client; and
   deleting the bound personal identity information on the first client after sending the bound personal identity information to the second client.

15. The computer-readable storage medium of claim 14, further comprising standardizing the personal identity information to be sent.

16. The computer-readable storage medium of claim 14, further comprising binding the personal identity information together with a container.

17. The computer-readable storage medium of claim 14, further comprising triggering the execution of the binding personal identity information together and sending the bound personal identity information together, in accord with a user action.

* * * * *